July 1, 1930.  J. A. PINAUD  1,768,784
ADJUSTABLE WIND VANE
Original Filed June 22, 1923   3 Sheets-Sheet 1

John A. Pinaud
Inventor

By his Attorney

July 1, 1930.  J. A. PINAUD  1,768,784
ADJUSTABLE WIND VANE
Original Filed June 22, 1923  3 Sheets-Sheet 3

John A. Pinaud
Inventor

By his Attorney

Patented July 1, 1930

1,768,784

UNITED STATES PATENT OFFICE

JOHN A. PINAUD, OF JERSEY CITY, NEW JERSEY

ADJUSTABLE WIND VANE

Continuation of application Serial No. 647,061, filed June 22, 1923. This application filed March 31, 1926.
Serial No. 98,686.

My present invention relates to a form of wind motor intended to be driven by currents of air however produced. The motor may be stationary or moved as a whole in the course of operation.

This application is a continuation of my pending application for improvement in adjustable wind vanes, filed June 22nd, 1923, Serial No. 647,061, which became abandoned after the filing of the present application.

The object of the present invention is to provide a form of air motor which shall be capable of regulation for constant speed whatever the speed of the current of air which drives it. The motor may be applied to the driving of electric generators, pumps, or any other useful purpose.

Motors of this kind have been built with attempted regulation depending upon rotation of the wind blades upon their own axes, whereby the inclination of the blades to the air current is varied to change the speed, but, so far as I am aware, these efforts have not been successful owing to certain disturbances of balance, the nature of which I have discovered, and for which my invention supplies a remedy.

It is one object of my invention to supply means whereby the influence of masses attached to the blades as well as the influence of the blades themselves tending to disturb regulation and arising from centrifugal force may be remedied.

Another principal object of the invention is the provision of a form of centrifugal governor wherein the force exerted by the governing weights is directly proportional to the angular displacement of the blade about its own axis, this relation being represented by a curve which is virtually a straight line. The force exerted by the opposing spring is also directly proportional to the angular displacement of the blade about its own axis, this relation being also represented by a straight line which may be practically coincident with the first mentioned curve.

My invention includes certain other features and advantages which are set forth fully hereinafter.

Figure 1:
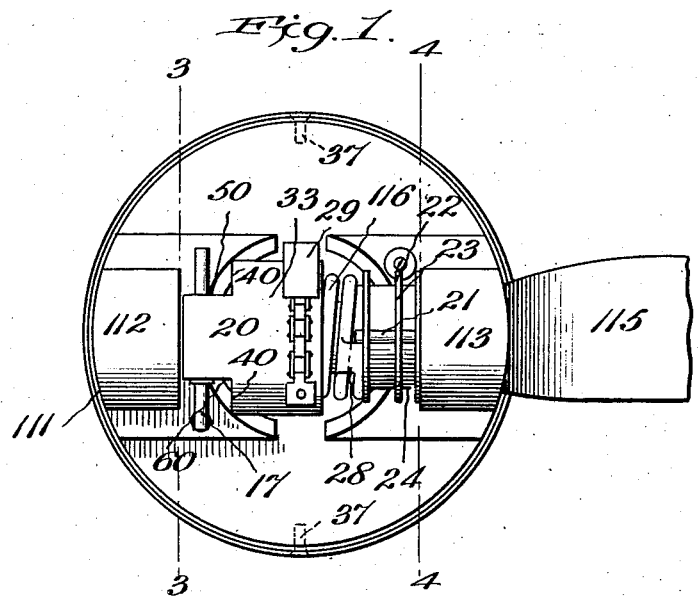
Figure 2:
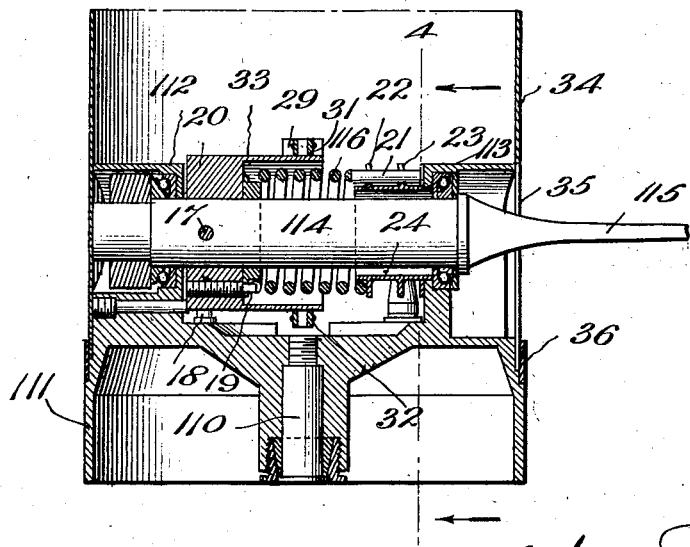
Figure 3:
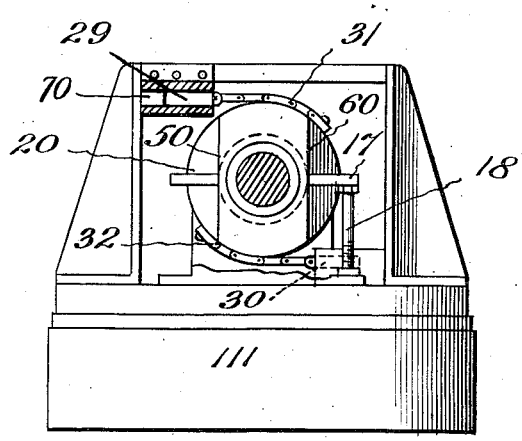
Figure 4:
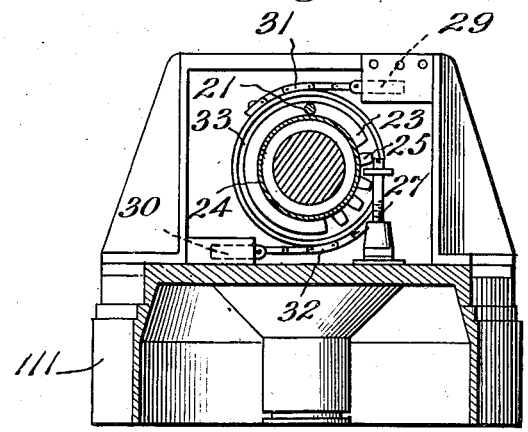

Figure 1 is a plan view of complete motor, Figure 2 a view of the same in vertical section, Figure 3 a cross sectional view on the line 3—3 in Figure 1, Figure 4 is a similar sectional view on the line 4—4 of Figure 1, and Figures 5, 6 and 7 are diagrams for exposition of the theory of torque balance.

Figure 5:
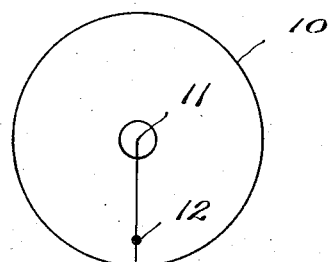

Referring to Figure 5, if any mass, represented by the circle 10, rotates upon an axis 11, supposed to be perpendicular to the plane of the paper (which will then be a plane of rotation) any single particle of the mass, not on the axis of rotation, will tend to move in a radial direction in consequence of centrifugal force. The particle 12, for instance, will exert a radial or centrifugal force along the line 11—12 in Figure 5. This tends to move the particle toward the plane of rotation.

Figure 6:
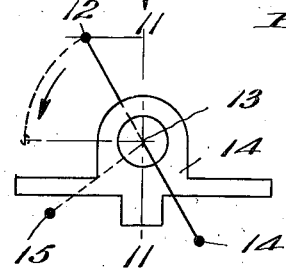

Referring now to Figure 6, let 13 represent the end view of the shaft of a wind vane (not shown) and let 14 represent the bearing therefor. The common axis of revolution of the wind vane and its carrying parts will then lie along the paper surface, as shown by the line 11—11. This axis will be hereinafter referred to as the main axis. In the process of adjustment of the wind vane blades about their own axes to vary their angle of inclination to the plane of rotation the shaft 13 must be turned, and the axis upon which this rotation is effected will be herein termed the "blade axis". This axis is at the center of the circle 13 and is perpendicular to the paper.

Let the point 12 on the paper surface represent any material particle fixed to the wind vane blades and shaft, and draw the line 13—12 from the blade axis to said particle. As has been shown with respect to Figure 5, the particle 12 will exert a centrifugal pull in the direction indicated by the arrow at right angles to 11—11 through 12, and it will exert a turning moment upon the shaft 13 which is proportional to sine times cosine of the angle which the line 13—12 makes with the main axis. This turning moment is therefore zero either in the line 11—11 or at right angles to it. It will have a maximum effect at forty-five degrees.

If we now consider a particle 14 in the prolongation of the line 12—13 equidistant with 12 from the axis 13, and on the opposite side, it will be seen that such a particle will follow the same law and its effect will be added to that of the particle 12. On the other hand, if an equal particle equidistant from the center be considered which is located on the line 13—15 at right angles to the line 12—14 it will be seen that such a particle, having equal mass with 12, will exactly counterbalance its effect in all positions. This follows around the axis 13 and from the constant equality of the products of the sines and cosines of the respective angles since the sine of one angle equals the cosine of the other.

It is for this reason that there is no tendency for a circular mass of uniform thickness whose axis is the blade axis to exert any rotative effort about the blade axis. Such is not the case, however, with any unsymmetrical and unbalanced structure like a wind vane blade.

Figure 7:
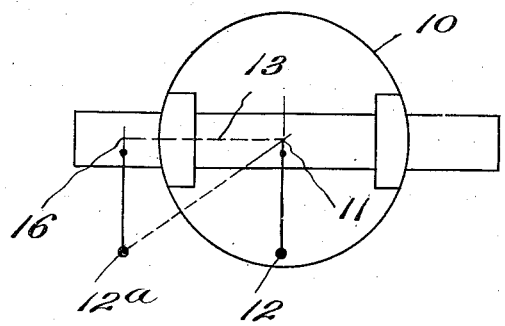

In Figure 6 we considered only particles in the plane of the paper (assumed to be the plane of the main axis) but Figure 7 has relation to the behavior of a particle 12 which is removed outward parallel to shaft 13 toward the extremity of one of the blades on the shaft 13, to a point 12ª. Here the main axis 11 is perpendicular to the paper, and the actual centrifugal tendency will be proportional to the line 11—12ª (as in Figure 5). This force is resolvable into two component forces at right angles to each other, one being graphically represented by the line 11—16 along the blade axis, and the other by the line 16—12ª. The turning moment exerted upon the shaft 13 is still represented by the line 12ª—16 perpendicular to the blade axis, and, as this is equal to the similar line 12—11, the moments will be equal. It is thus seen that every particle in the wind vane shaft and blades which is not in the blade axis will exert a twining moment tending to bring such particle into the plane of rotation around the main axis 11 (see curved arrow in Figure 6).

The tendencies of opposite particles as 12 and 14 in Figure 6 will be added or will assist each other, to tend to turn the blades in the same direction. On the other hand, each particle of equal mass in the right angle position 15 will have a turning moment also seeking the plane of rotation, but by an opposed angular movement. In the sum total of the infinitesimal particles making up the body of the wind vane shaft and blades there will, therefore, be an unbalanced mass on each side of the blade axis corresponding to the leading and trailing portion of the blade, the position of whose center of gravity can be determined for each particular case. It is this unbalanced mass on each side which constantly tends to twist the wind vane blades flat—or into the plane of rotation about the main axis, and this is the source of the disturbing effort which has been met with in previous efforts to adjust the inclination of such blades while running.

For the purpose of obviating this disturbing effort my invention involves the provision of a mass or masses so placed as to balance these unbalanced portions of the wind vane system, that is, to place the wind vane system in torque balance.

Referring now to Figs. 1-4, the end of the shaft to be driven is shown at 110 in Figure 2, and this carries the cylindrical head 111 upon the outer surface of which are the bearings 112 and 113 for the shaft 114 of the wind vane 115. This shaft 114 is mounted in a well known manner so as to be revoluble within limits for the purpose of adjusting the degree of inclination of the wind vane 115.

A helical spring 116 surrounds the shaft 114, and tends constantly to force the transverse pin 17 against the head of the adjustable (screw threaded) abutment 18. This latter is adjusted in practice so as to give the proper initial inclination to the vane 115.

One end of the spring 116 abuts against the pin 19 inserted in the sleeve 20, which, in turn, is fixed upon the shaft 114 which it surrounds. The opposite end of the spring abuts against the pin 21 which passes through the two circular flanges 22 and 23 on the cylinder 24, supported revolubly within the bearing 13. In order to hold the cylinder 24 in a fixed adjustable position, despite the pressure of the spring 116, the flange 23 is provided with a series of teeth, 25, one of which bears against the collar 26 on the adjustment screw 27.

It is a preferred feature of the invention that each end of the spring should be united firmly (preferably by welding) to the next adjacent convolution of the spring, as indicated at 28 in Figure 1. I have found that this removes the adjustment error otherwise introduced by the rubbing of the free convolution against the stationary end of the spring. This error has a marked detrimental effect in preventing perfect governing of the device.

In order that the tendency to changes of speed in the revolution of the shaft 110 may be counteracted within suitable limits, the incipient speed changes are made to set up corresponding changes in the centrifugal force which operates to increase the angle of inclination of the wind vane to the plane of rotation. For this purpose, I prefer to provide two governor weights, 29 and 30, each of which is fixed to the end of a chain 31, 32, whose opposite end is attached to the shaft 114, through an overhanging sleeve 33, projecting from the body 20.

As shown in Figure 3, these governor weights lie in an appropriate guide 70 well out of the main axis, so that their centrifugal effort exerts a constant pull tending to incline the vane 115 more and more to the plane of rotation about the main axis, lifting the pin 17 off of the abutment 18.

As has already been explained with respect to Figures 5, 6 and 7, the unbalanced parts of the wind vane and of the elements fixed thereto have a tendency to seek the plane of rotation by virtue of their centrifugal force, and this tendency corresponds theoretically to that exerted by an imaginary body of a definite mass, lying at a definite distance from the adjustment axis. In order to counteract this tendency (which I have discovered to interfere greatly with proper governing action) I supply one or more (preferably two opposed) weights whose combined turning moment with respect to the adjustment axis is equal that of said imaginary mass and whose center of gravity lies in a line radial with respect to said axis and at right angles with the radial line through the center of gravity of said imaginary mass.

It is within the scope of my invention to utilize one or more correcting masses in this manner, however shaped and located, so long as they conform substantially to the conditions above laid down.

In the particular preferred construction shown and described herein, the two opposed masses for this purpose are provided by forming the body 20 with an extension, formed by cutting the otherwise cylindical mass along the three planes 40, 50 and 60 (see Figures 1 and 3). This extension is shown in plan in Figure 1 and in end view in Figure 3. In the latter view is drawn a dotted circle circumscribing a central annular core all of the particles of which are mutually balanced by virtue of the shape of the core. All those parts of the extension, however, which lie above and below this dotted circle constitute the equal and cooperating correcting masses which serve for the purpose just described. Owing to the presence of these masses, the disturbing tendency of the wind vane to seek to lie in the plane of rotation (due to the causes hereinbefore discussed) is counteracted, with the result that the governing weights act without interference or obstruction to produce perfect governing of the device.

For the protection of the bearings etc., I prefer to employ a cover fitted over the end of the supporting body 111 and secured thereon as follows.

The cover, which is preferably dome-shaped (the top being cut away in Figure 2) comprises a thin cylindrical portion 34. Two adjacent circular shoulders are cut around the periphery of the upper part of the body 111 and the edge of the cover is fitted down upon the inner one of these. A fairly large opening is cut away at 35 to accommodate the base of the wind vane, and, to prevent the lower edges from springing outward at the sides of this opening, a circular ring 36 fits down onto the outer shoulder on the body 111 and closely embraces the lower edge of the cover when in place by screws 37 or other appropriate fastenings.

Various changes may be made in this apparatus without departing from the scope of the invention, and I do not limit myself to the details herein shown and described. It is obvious that, so far as the balancing features herein explained are concerned, they are applicable equally to the wind vanes of the motor driven by a current of air and to a propeller which acts upon the air to produce mechanical motion. Accordingly my broad claims relating to this balancing effect, although not included in this application, form a part of my copending patent application, Serial Number 647,060, filed June 22nd, 1923, and include both the propeller and the wind vane.

What I claim is—

1. In combination with a wind vane of the general character described having a rotatably mounted shaft and a helical spring surrounding said shaft, a cylindrical body fixed to said shaft having a hollow sleeve overhanging said spring, flexible connections lying over the periphery of said sleeve and fixed thereto at one end of each flexible connection, and governing weights fixed to the free ends of said flexible connections.

2. In combination with a wind vane of the general character described having a rotatably mounted shaft, a spring acting on said shaft in a direction to turn the blade to its starting position, a governing weight, and a flexible connection between said weight and shaft, said weight being arranged to act through said flexible connection tangentially at all times on said shaft in a direction to turn it against the action of said spring.

3. An adjustable device comprising a hub member having a main axis, a transverse member having an axis transverse to the main axis, means for pivotally mounting said transverse member on said hub member so that the transverse member is pivotable about its own axis, actuating means responsive to the speed of rotation about said main axis for changing the angular position of said transverse member about its own axis, restoring means opposing said actuating means, and means whereby the force exerted by said actuating means and restoring means is directly proportional to the angular displacement of said transverse member about its own axis.

4. A wind motor comprising a hub member having a main axis, a transverse blade having an axis substantially intersecting the main axis, means for pivotally mounting said blade on said hub member so that the blade is pivotable about its own axis, actuating means responsive to the speed of rotation about said main axis for changing the angular position of said blade about its own axis, restoring means opposing said actuating means, and means whereby the force exerted by said actuating means and restoring means is directly proportional to the angular displacement of said transverse member about its own axis, whereby close regulation of the speed of rotation about the main axis is obtained.

5. A wind motor comprising a hub member having a main axis, a transverse blade having an axis substantially intersecting the main axis, means for pivotally mounting said transverse blade on said hub member so that the blade is pivotable about its own axis, governing weights, said blade having a cylindrical portion, flexible connections connecting said weights and the periphery of said cylindrical portion whereby said weights always act tangentially on said blade, restoring means for opposing the force exerted by said governing weights, guides on said hub member for said weights which are radial with respect to said main axis and perpendicular to the axis of the blade, and means including weights for placing said blade in torque balance about said main axis.

6. An adjustable device comprising a hub member having a main axis, a transverse member having an axis substantially intersecting the main axis, means for pivotally mounting said transverse member on said hub member so that the transverse member is pivotable about its own axis, governing weights, said transverse member having a cylindrical portion, flexible connections connecting said weights and the periphery of said cylindrical portion whereby said weights always act tangentially on said transverse member, a coil spring surrounding the axis of said transverse member and connected thereto and to said hub member, said spring traversing said main axis guides on said hub member for said weights which are radial with respect to said main axis and perpendicular to the axis of the transverse member, and means for placing said transverse member in torque balance about said main axis.

7. An adjustable device comprising a hub member having a main axis, a transverse member having an axis substantially intersecting the main axis, means for pivotally mounting said transverse member on said hub member so that the transverse member is pivotable about its own axis, a governing weight, said transverse member having a cylindrical portion, a flexible connection connecting said weight and the periphery of said cylindrical portion whereby said weight always acts tangentially on said transverse member, restoring means for opposing the force exerted by said governing weight, and a guide on said hub member for said weight which is radial with respect to said main axis and perpendicular to the axis of the transverse member.

8. A wind motor comprising a hub member having a main axis, a transverse blade member having an axis substantially intersecting the main axis, means for pivotally mounting said transverse blade member on said hub member so that the blade member is pivotable about its own axis, actuating means responsive to the speed of rotation about said main axis for changing the angular position of said blade member about its own axis and a restoring spring opposing said actuating means disposed across said main axis so that it is subjected to a minimum of centrifugal force due to rotation about said main axis.

9. An adjustable device comprising a hub member having a main axis, a transverse member having an axis substantially intersecting the main axis, means for pivotally mounting said transverse member on said hub member so that the transverse member is pivotable about its own axis, actuating means responsive to the speed of rotation about said main axis for changing the angular position of said transverse member about its own axis, a restoring spring opposing said actuating means, said spring being coiled about the axis of said transverse member and intersecting said main axis.

In testimony whereof I have hereto affixed my signature on this 30th day of March, 1926.

JOHN A. PINAUD.